(12) United States Patent
Yuan et al.

(10) Patent No.: US 12,737,623 B2
(45) Date of Patent: Sep. 15, 2026

(54) REVERSE DATA GENERATION AND DATA DISTRIBUTION ANALYSIS TO VALIDATE ARTIFICIAL INTELLIGENCE MODEL

(71) Applicant: INTERNATIONAL BUSINESS MACHINES CORPORATION, Armonk, NY (US)

(72) Inventors: Zhong Fang Yuan, Xi'An (CN); Tong Liu, Xi'An (CN); Shuang Yin Liu, Beijing (CN); Jun Wang, Xi'An (CN); Yan Fen Liu, Tianjin (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 825 days.

(21) Appl. No.: 18/190,268

(22) Filed: Mar. 27, 2023

(65) Prior Publication Data

US 2024/0330675 A1 Oct. 3, 2024

(51) Int. Cl.
*G06N 3/08* (2023.01)
*G06N 3/0455* (2023.01)

(52) U.S. Cl.
CPC ............. *G06N 3/08* (2013.01); *G06N 3/0455* (2023.01)

(58) Field of Classification Search
CPC .............................. G06N 3/08; G06N 3/0455
USPC .......................................................... 706/25
See application file for complete search history.

(56) References Cited

U.S. PATENT DOCUMENTS 11,068,453 B2 7/2021 Griffith
11,163,527 B2 11/2021 Oberbreckling et al.
2015/0039591 A1* 2/2015 Ding ....................... G06F 11/36 707/722
2020/0019890 A1 1/2020 Rossi et al.
2020/0356901 A1 11/2020 Zarandioon et al.
2022/0188703 A1* 6/2022 Hong ..................... G06N 20/00
(Continued)

FOREIGN PATENT DOCUMENTS

KR 20220085740 A 6/2022

OTHER PUBLICATIONS

D. Dahmen et al., "Generation of Virtual test scenarios for training and validation of AI-based systems", 2021 International conference on progress in informatics and computing (PIC) , 2021 (Year: 2021).*

(Continued)

*Primary Examiner* — Tsu-Chang Lee

(74) *Attorney, Agent, or Firm* — Robert D. Bean, Esq.; Blanche E. Schiller, Esq.; Heslin Rothenberg Farley & Mesiti P.C.

(57) ABSTRACT

Validity of a trained artificial intelligence model is verified. The verifying the validity includes generating a training dataset from the trained artificial intelligence model using reverse data generation of the trained artificial intelligence model. The training dataset generated using the reverse data generation is compared with a test dataset used to evaluate the trained artificial intelligence model. The comparing is to determine a relationship between the training dataset that was generated and the test dataset. Data from the test dataset determined to have a predefined relationship with the training dataset is removed to obtain a new test dataset. The new test dataset is used to verify the validity of the trained artificial intelligence model.

20 Claims, 6 Drawing Sheets

(56) References Cited

U.S. PATENT DOCUMENTS

2022/0230024 A1 7/2022 Kallianpur et al.
2023/0222360 A1* 7/2023 Liu ........................ G06N 5/022
706/12

OTHER PUBLICATIONS

Sun, Yiyou et al., "Out-of-Distribution Detection with Deep Nearest Neighbors," Proceedings of the 39$^{th}$ International Conference on Machine Learning, Jun. 17, 2022, 14 pages.

* cited by examiner

REVERSE DATA GENERATION AND DATA DISTRIBUTION ANALYSIS TO VALIDATE ARTIFICIAL INTELLIGENCE MODEL

BACKGROUND

One or more aspects relate, in general, to facilitating processing within a computing environment, and in particular, to facilitating processing relating to artificial intelligence modeling.

Subsequent to training an artificial intelligence model, such as a deep learning model, the validity of the model is verified. Typically, in training a deep learning model, a data set is divided into a training set, a development set and a test set. The training set is used to make the model fit a set of data or a mathematical distribution, the development set is used to find appropriate super-references for the model and the test set is used to evaluate the metrics of the model and evaluate the accuracy and/or acceptability of the model.

In this testing process, the independence of the test set compared to the training set becomes important. If the data in the test set and the training set are too similar, then a phenomenon of false high model performance may occur.

SUMMARY

Shortcomings of the prior art are overcome, and additional advantages are provided through the provision of a computer-implemented method of facilitating processing within a computing environment. The computer-implemented method includes verifying validity of a trained artificial intelligence model. The verifying the validity includes generating a training dataset from the trained artificial intelligence model using reverse data generation of the trained artificial intelligence model. The training dataset generated using the reverse data generation is compared with a test dataset used to evaluate the trained artificial intelligence model. The comparing is to determine a relationship between the training dataset that was generated and the test dataset. Data from the test dataset determined to have a predefined relationship with the training dataset is removed to obtain a new test dataset. The new test dataset is used to verify the validity of the trained artificial intelligence model.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
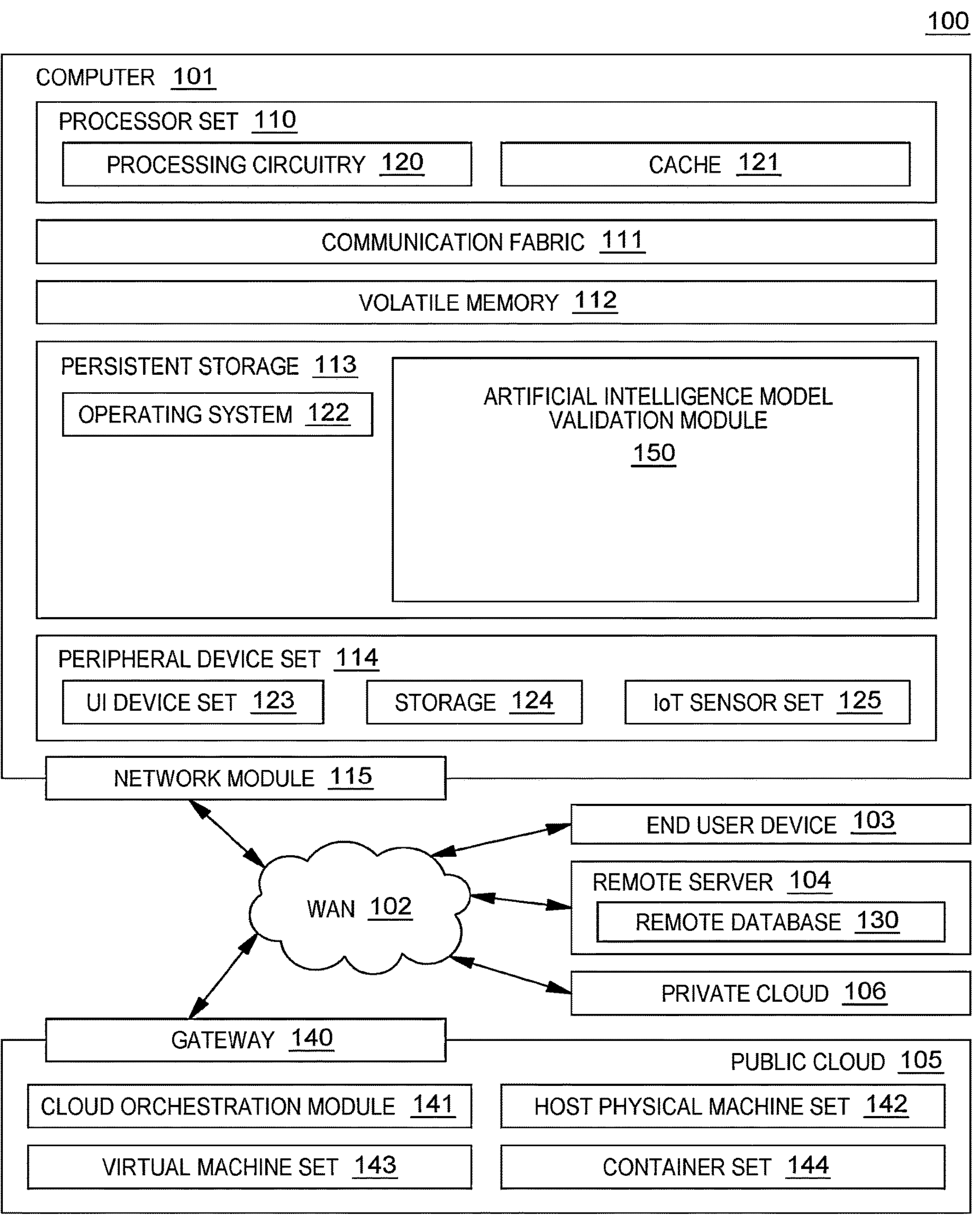
FIG. 1 depicts one example of a computing environment to incorporate and use one or more aspects of the present invention.

In accordance with one or more aspects, a capability is provided to facilitate processing within a computing environment. In one or more aspects, the capability includes facilitating artificial intelligence processing, including, for example, determining whether artificial intelligence prediction is reliable. In one or more aspects, the capability includes evaluating reliability of an artificial intelligence model, such as a deep learning or neural network model. For instance, the capability includes validating the model based on reverse data generation and data distribution analysis (e.g., data distribution homogeneity analysis).

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., validates an artificial intelligence model, and/or performs one or more other aspects of the present invention. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 1. In one example, a computing environment 100 contains an example of an environment for the execution of at least some of the computer code involved in performing the inventive methods, such as an artificial intelligence model validation code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Other variations are possible.

In one or more aspects, an artificial intelligence model validation module (e.g., artificial intelligence model validation module 150) is used to validate an artificial intelligence model. An artificial intelligence model validation module (e.g., artificial intelligence model validation module 150) includes code or instructions used to perform validation of a model, such as an artificial intelligence model (e.g., a deep learning model, a neural network model, etc.), in accordance with one or more aspects of the present invention. An artificial intelligence model validation module (e.g., artificial intelligence model validation module 150) includes, in one example, various sub-modules to be used to perform the processing. The sub-modules are, e.g., computer readable program code (e.g., instructions) in computer readable media, e.g., storage (storage 124, persistent storage 113, cache 121, other storage, as examples). The computer readable media may be part of a computer program product and the computer readable program code may be executed by and/or using one or more computing devices (e.g., one or more computers, such as computer(s) 101; one or more servers, such as remote server(s) 104; one or more processors or nodes, such as processor(s) or node(s) of processor set 110; processing circuitry, such as processing circuitry 120 of processor set 110; and/or other computing devices, etc.). Additional and/or other computers, servers, processors, nodes, processing circuitry and/or other computing devices may be used to execute one or more of the sub-modules and/or portions thereof. Many examples are possible.

Figure 2A:
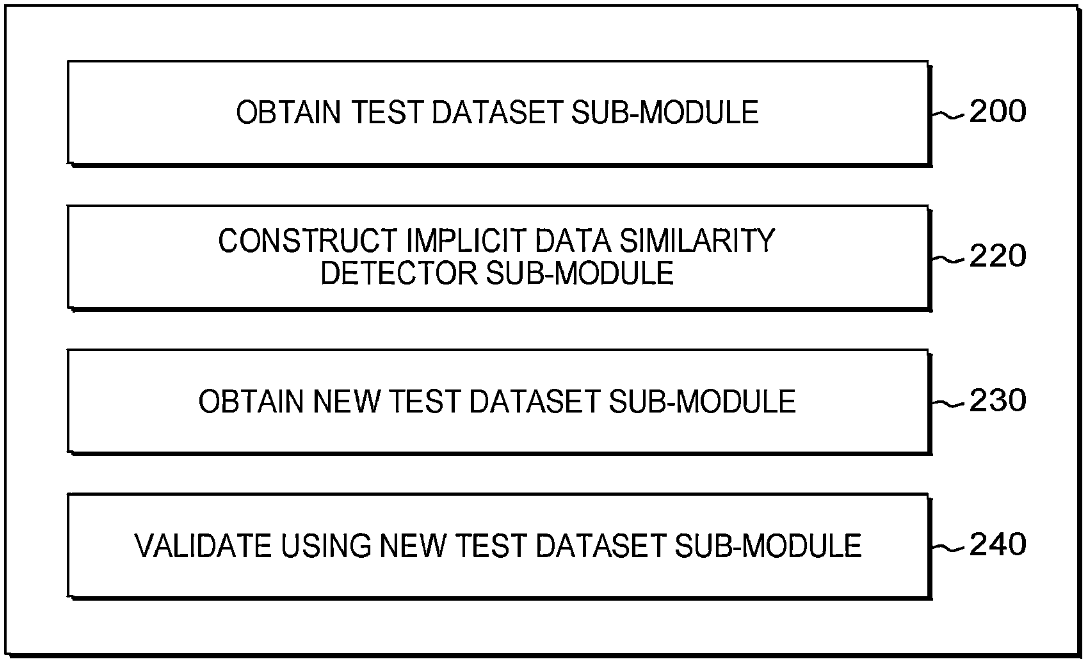
FIG. 2A depicts one example of sub-modules of an artificial intelligence model validation module of FIG. 1, in accordance with one or more aspects of the present invention.

One example of artificial intelligence model validation module 150 is described with reference to FIG. 2A. In one example, artificial intelligence model validation module 150 includes an obtain test dataset sub-module 200 to obtain testing data used to evaluate a trained artificial intelligence model (also referred to herein as trained model, model, etc.); a construct implicit data similarity detector sub-module 220 to construct an implicit data similarity detector to be used to determine the similarity of a generated training dataset to the obtained test dataset, as defined by one or more criteria; obtain new test dataset sub-module 230 to obtain new testing data (e.g., a new test dataset) using the constructed detector; and a validate using new test dataset sub-module 240 to validate the trained model using the new test data. Additional, fewer and/or other sub-modules may be provided and/or used in one or more aspects of the present invention.

Figure 2B:
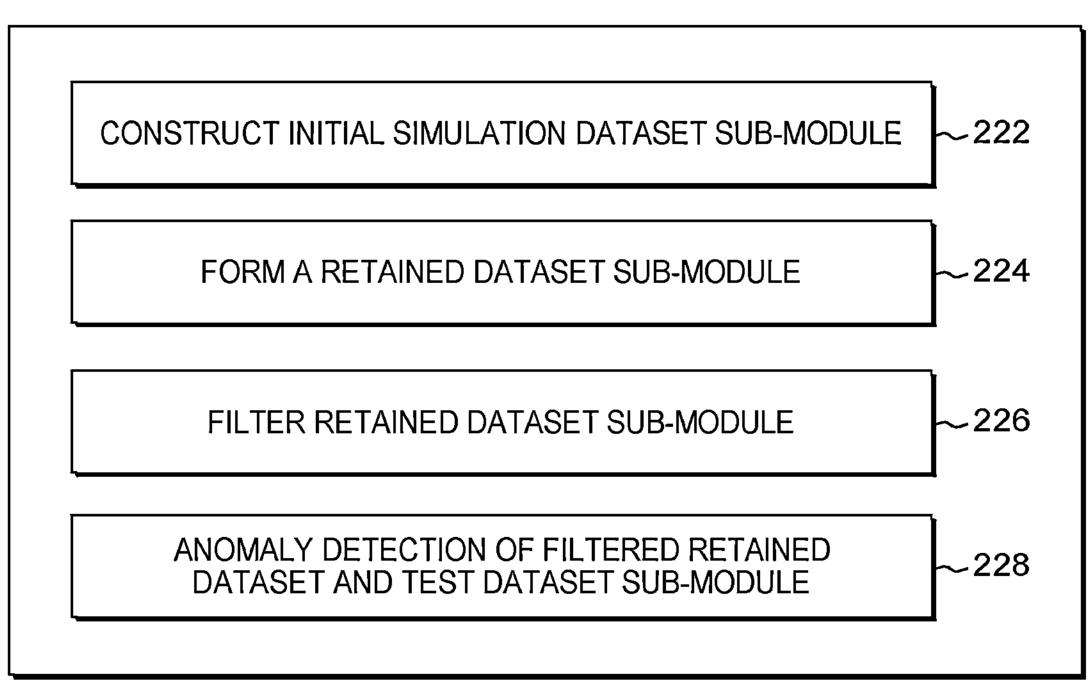
FIG. 2B depicts one example of sub-modules of a construct implicit data similarly detector sub-module of FIG. 2A, in accordance with one or more aspects of the present invention.

Additional details related to construct implicit data similarity detector sub-module 220 are described with reference to FIG. 2B. As one example, construct implicit data similarity detector sub-module 220 includes a construct initial simulation dataset sub-module 222 to generate an initial simulation dataset; a form a retained dataset sub-module 224 to form a retained dataset from the initial simulation dataset; a filter retained dataset sub-module 226 to filter out redundant data in the retained dataset producing a filtered retained dataset (e.g., output data subsequent to filtering); and an anomaly detection of filtered retained dataset and test dataset sub-module 228 to mix the filtered retained dataset and test dataset and determine any anomalies.

The sub-modules are used, in accordance with one or more aspects of the present invention, to validate an artificial intelligence model, as further described with reference to FIG. 3. In one example, an artificial intelligence model validation process (e.g., an artificial intelligence model validation process 300) is implemented using one or more of the sub-modules (e.g., sub-modules 200-240) and is executed by one or more computing devices (e.g., one or more computers (e.g., computer(s) 101, other computer(s), etc.), one or more servers (e.g., server(s) 104, other server(s), etc.), one or more processor(s), node(s) and/or processing circuitry, etc. (e.g., of processor set 110 or other processor sets), and/or other computing devices, etc.). Although example computers, servers, processors, nodes, processing circuitry and/or computing devices are provided, additional, fewer and/or other computers, servers, processors, nodes, processing circuitry and/or computing devices may be used for the artificial intelligence model validation process and/or other processing. Various options are possible.

Figure 3:
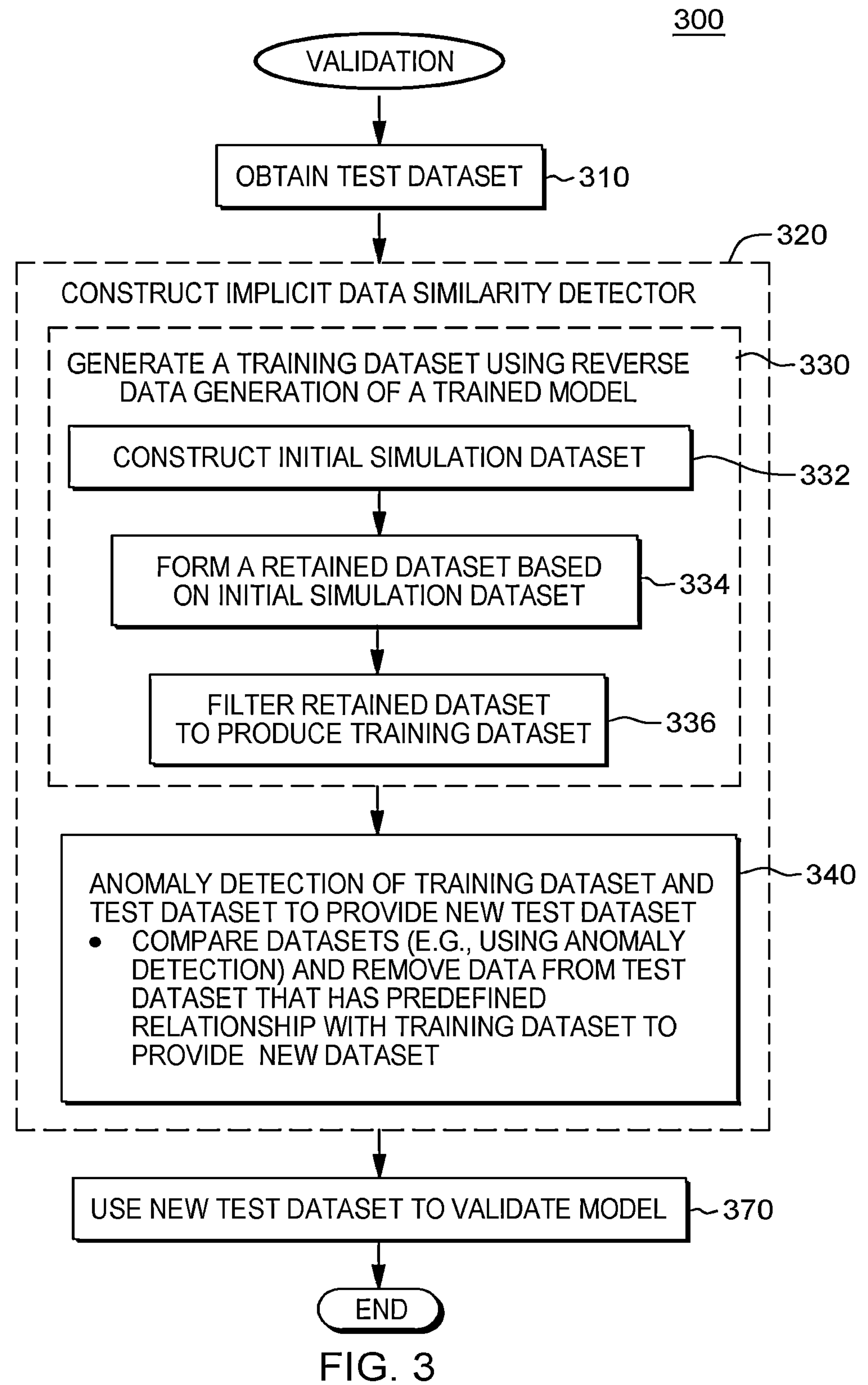
FIG. 3 depicts one example of an artificial intelligence model validation process, in accordance with one or more aspects of the present invention.

Referring to FIG. 3, in one example, artificial intelligence model validation process 300 (also referred to herein as process 300) obtains 310 a test dataset. This is, for instance, the testing data used to test the trained artificial intelligence model.

Further, in one example, process 300 constructs 320 an implicit data similarity detector. The detector generates a training dataset (e.g., a simulation training dataset) using latent fitting properties of the model to the data distribution and determines, for instance, whether a certain piece of data in the test dataset is highly similar, based on one or more selected criteria, to data in the generated training dataset. If part of the data in the test dataset is highly similar based on the one or more selected criteria to the data in the generated training dataset, then it is assumed that this part of the data is not intrinsically useful for evaluating the model and is to be deleted providing a new test dataset that may be used to validate the trained model.

In one or more aspects, construction of the implicit data similarity detector includes, for instance, process 300 generating 330 a training dataset from a trained artificial intelligence model using reverse data generation of the trained model and performing 340 anomaly detection of the generated training dataset and the test dataset, as described herein.

Figure 4:
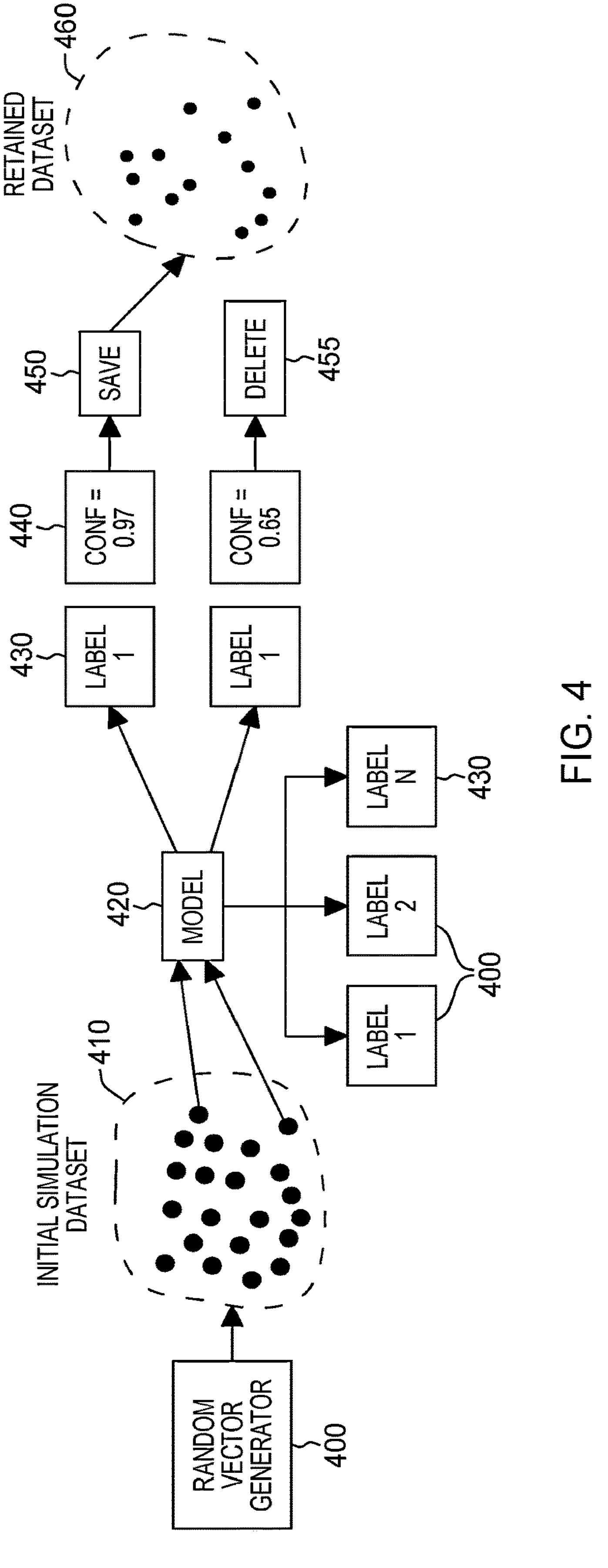
FIG. 4 depicts one example of constructing an initial simulation dataset and a retained dataset, in accordance with one or more aspects of the present invention.

In one example, the generating the training dataset includes process 300 constructing 332 an initial simulation dataset. In one example, this includes process 300 generating a simulation dataset by randomly initializing, e.g., Gaussian noise, which is a simulation of the data distribution represented by the trained model. As shown in FIG. 4, in one example, process 300 uses a random vector generator 400 to generate a random vector that is to conform to, e.g., a Gaussian distribution. A Gaussian distribution (also known as a normal distribution) is a bell-shaped curve, and it is assumed that during any measurement, values will follow a normal distribution with an equal number of measurements above and below the mean value. In one example, random vector generator 400 randomly initializes a large amount of Gaussian noise as simulation inputs constructing a simulation dataset 410 of the trained artificial intelligence model. The simulation dataset is a simulation of a distribution of data represented by the trained artificial intelligence model. The simulation inputs (e.g., vector data of the constructed simulation dataset) are passed through the trained model 420 and the classes and confidences the model attaches to these inputs are observed. The trained model (e.g., model 420) is used to perform forward inference, and the model attaches a label 430 to each input vector and gives a corresponding confidence value 440 regarding appropriateness as part of the training dataset.

Returning to FIG. 3, in one example, based on the constructed initial simulation dataset, process 300 forms 334 a retained dataset. For instance, referring to FIGS. 3 and 4, process 300 evaluates the simulation inputs (e.g., vector data), and simulation inputs that have confidence values 440 with a predefined relationship (e.g., greater than) to a confidence comparator value (e.g., 0.95) are retained 450, otherwise, they are deleted 455. The retained simulation inputs 460 (referred to herein as a retained dataset) can be regarded as the most familiar part of the trained model, and it can be considered that the model's familiarity with this part of the sample is basically equal to the familiarity with the training set. Thus, the initial simulation data set is filtered and the retained dataset 460 is the data that the model grasps in the inference process. The retained, filtered data is very similar to the training set, because when a model is trained, the model often presents a high confidence for the data in the training set.

Referring to FIG. 3, in one example, the retained data set (e.g., dataset 460) is further integrated and filtered 336 producing a filtered retained dataset, so that the retained dataset is more evenly distributed, avoiding the phenomenon that the retained data is concentrated in only a few data clusters. The more uniform the distribution of the dataset, the easier it is to fit the data distribution into a normalized form.

In one example, based on the simulation input reaching a certain level (e.g., 100K level) and a dataset being formed (e.g., dataset 460), process 300 filters 336 the retained simulation dataset (e.g., dataset 460) to produce a filtered retained dataset. In one example, process 300 uses, for instance, density clustering (e.g., density-based spatial clustering of applications with noise (DBSCAN)) to filter the simulation input a predefined number of times (e.g., twice). This filtering is performed to remove redundancy in the dataset formed by the simulation input. This facilitates fitting the filtered dataset into a selected mathematical distribution.

Figure 5:
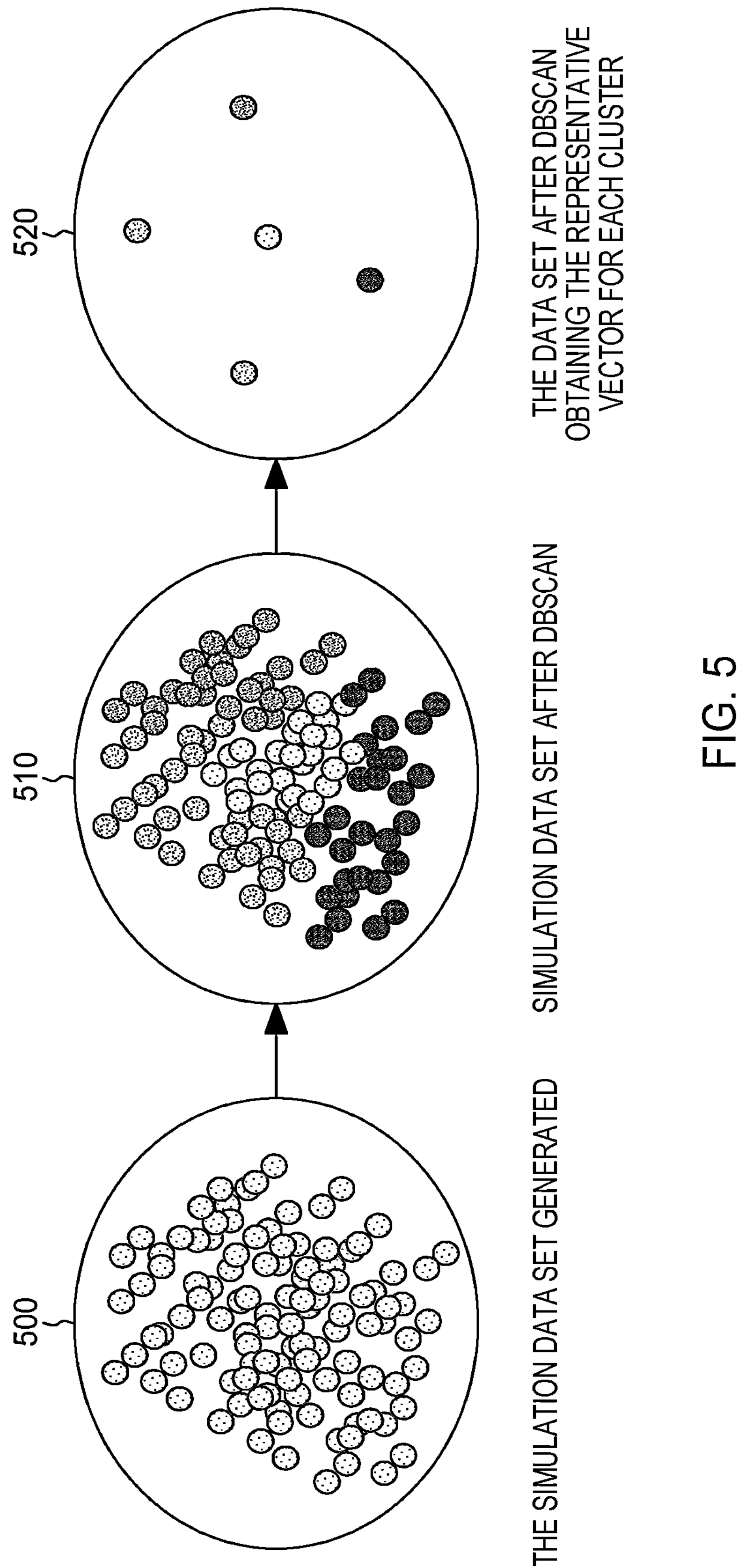
FIG. 5 depicts one example of removing redundancy from a retained dataset, in accordance with one or more aspects of the present invention.

To further explain, in one example, referring to FIG. 5, a previously generated dataset 500 (e.g., dataset 460) is further integrated and filtered so that the generated simulation dataset is more evenly distributed. For the simulation dataset generated, process 300 uses density clustering to perform an autonomous clustering operation to cluster the retained simulation dataset (e.g., dataset 460) into K categories or partitions (K usually takes a large value, e.g., 2000), as shown at 510. In one example, the density clustering uses a density-based spatial clustering of applications with noise, which is a density-based clustering non-parametric technique. With this technique, given a set of points in some space, points that are closely packed together (points with many nearby neighbors) are grouped together, marking as outliers points that lie alone in low-density regions (whose nearest neighbors are too far away). When the clustering operation is completed, process 300 averages the data belonging to the same cluster to generate a cluster representative vector as shown at 520. Based on performing this operation, the dataset changes from a massive, unevenly distributed dataset to a more sparse, evenly distributed dataset, referred to herein as a filtered retained dataset. The filtered retained dataset is the training dataset generated from the trained artificial intelligence model using reverse data generation of the trained artificial intelligence model.

Returning to FIG. 3, subsequent to generating the training dataset, process 300 performs anomaly detection 340 of the generated training dataset and the test dataset to provide a new test dataset. The anomaly detection is used to measure whether datasets belong to the same distribution, so as to subtly measure the similarity between the test dataset and the generated training dataset. The generated training dataset is, for instance, a dataset that can be predicted with high confidence by the model and with a clear distinction between the data. According to, e.g., Monte Carlo's law, the larger the size of this dataset, the closer it is to the training data in terms of data distribution. Thus, at this point, there is a generated training dataset that is very close to the training data in terms of data distribution. Therefore, to determine whether there is data-level similarity between the test dataset and the generated training dataset, the similarity between the generated training dataset and the test dataset are compared. However, since the generated training dataset is generated from random vectors, the random nature of the training dataset may not be similar to the test dataset when measured at the level of the individual data vectors. This means that it is not easy to determine whether the test dataset and the training datasets are related by comparing vectors with each other, such as calculating the cosine similarity between the vectors. Instead, in accordance with one or more aspects, the data distribution of the two datasets is analyzed to measure whether the two datasets are related by nature.

In one example, an anomaly determination technique (e.g., a deep auto-encoding Gaussian mixture model (DAGMM)) is used. Based on previous processing, there is a dataset (e.g., the generated training dataset) that can be predicted with high confidence by the model and with significant differentiation between the data. There is also a test dataset. In one example, the two datasets are mixed together, and the mixed dataset is fit with an anomaly detection technique, such as the deep auto-encoding Gaussian mixture model. Since the training datasets are basically the types of samples that are easiest for the model to evaluate, if some samples in the test dataset are mixed with the training dataset, and no anomaly can be found by using the anomaly detection task, then this part of the samples in the test dataset can be evaluated. If the test data is highly similar to the data in the training dataset and cannot be used for evaluation of the model, it is to be deleted.

Figure 6:
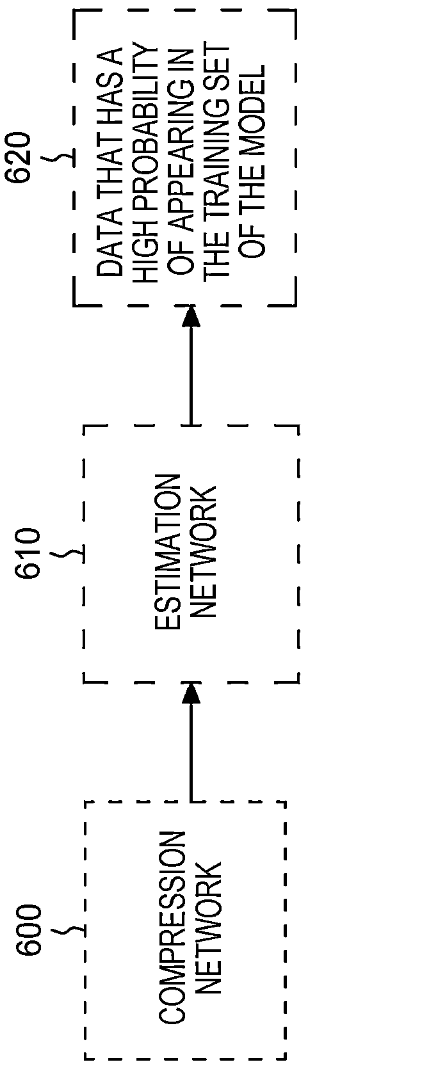
FIG. 6 depicts one example of anomaly detection, in accordance with one or more aspects of the present invention.

In one example, the deep auto-encoding Gaussian mixture model is divided into a plurality of networks. For instance, as shown in FIG. 6, it is divided into a compression network 600 and an estimation network 610. The compression network performs dimensionality reduction for input samples by a deep auto-encoder, prepares their low-dimensional representations from both the reduced space and the reconstruction error features, and feeds the representations to the subsequent estimation network. The low-dimensional representations provided by the compression network contains, e.g., two sources of features, including, for instance, the reduced low-dimensional representations learned by a deep auto-encoder; and the features derived from reconstruction error. The estimation network takes the feed and predicts their likelihood/energy in the framework of, e.g., a Gaussian Mixture Model (GMM). For instance, the estimation network performs density estimation under the framework of the Gaussian Mixture Model.

In one example, process 300 uses the estimation network to detect the degree of integration of the two datasets (e.g., the training dataset and the test dataset). If the two datasets are evaluated to be overlapping at the data distribution level, the data in the test dataset can be determined based on the overlap in the data distribution level. This part of the data in the test dataset 620, which is considered to have a high probability of appearing in the training dataset of the model, is to be removed providing a new test dataset.

In one example, process 300 uses 370 the new test dataset to validate the model.

In one or more aspects, reliability of artificial intelligence prediction is evaluated based on, e.g., evaluating test data fitness. The evaluating the test data fitness involves, for instance, identifying high similarity between pieces of data in a test dataset and a training dataset. In one example, a large amount of Gaussian noise is randomly initialized as simulation inputs. The simulation inputs are passed through the trained model for observing class and confidences attached to the inputs by the model. Simulation inputs with a confidence that has a predefined relationship (e.g., greater than) to a predefined value, such as 0.95 (regarded as the most familiar part of the trained model), are retained. The model's familiarity with this part of the sample is considered basically equivalent to the familiarity with the training dataset. A measurement technique based on density clustering (e.g., density-based spatial clustering of applications with noise) is utilized to perform secondary filtering on the simulation input, as the simulation input reaches a certain level (e.g., 100K level) after forming the dataset. Redundancy in the dataset formed by the simulation input is removed as a part of cutting data clusters making it easier to fit a filtered dataset to a selected mathematical distribution. The second-filtered simulation dataset is mixed with the test dataset and anomaly detection tasks are performed on the mixed dataset using, e.g., a deep auto-encoding Gaussian mixture model. The blending of some samples in the test dataset with the simulation dataset is identified. If no abnormalities are found through the anomaly detection task, then this part of the sample in the test dataset can be evaluated as highly similar to the data in the training dataset, and it is not useful for evaluating the model and should be deleted.

One or more aspects of the present invention are tied to computer technology and facilitate processing within a computer, improving performance thereof. For instance, the reliability of an artificial intelligence model (which may be used in many environments, including but not limited to computing, manufacturing, medical, services, etc.) may be validated even though the training dataset used to train the artificial intelligence model is unavailable. This improves processing that uses the artificial intelligence model and increases reliability. Processing within a processor, computer system and/or computing environment is facilitated.

One or more aspects may use, be related to and/or benefit from machine learning. For instance, the model being validated is a machine learning model. In one example, a machine learning training system may be utilized, in one or more aspects, to perform cognitive analyses of various inputs, including input data, testing data, data from one or more data structures and/or other data for an event. Program code in embodiments of the present invention may perform cognitive analysis to generate one or more training data structures, including algorithms utilized by the program code to predict states of a given event. Training models may be generated and used for prediction. These models may be updated (e.g., continuously, periodically) based on, e.g., selections made, etc. Many variations are possible.

In one example, a model generated by the program code (e.g., an artificial intelligence model being validated) is automatically updated by the program code based on active event feedback, as well as from the feedback received from data related to the event. For example, when the program code determines that there is a constraint, event or pattern that was not previously predicted by the model, the program code utilizes a learning agent to update the model to reflect the state of the event, in order to improve predictions in the future. Additionally, when the program code determines that a prediction is incorrect, either based on receiving user feedback through an interface or based on monitoring related to the event, the program code updates the model to reflect the inaccuracy of the prediction for the given period of time. Program code comprising a learning agent cognitively analyzes the data deviating from the modeled expectations and adjusts the model to increase the accuracy of the model, moving forward.

In one or more embodiments, program code, executing on one or more processors, utilizes an existing cognitive analysis tool or agent (now known or later developed) to tune the model, based on data obtained from one or more data sources. In one or more embodiments, the program code interfaces with certain application programming interfaces to perform a cognitive analysis of obtained data. Specifically, in one or more embodiments, certain application programming interfaces comprise a cognitive agent (e.g., learning agent) that includes one or more programs, including, but not limited to, natural language classifiers, a retrieve and rank service that can surface the most relevant information from a collection of documents, concepts/visual insights, trade off analytics, document conversion, and/or relationship extraction. In an embodiment, one or more programs analyze the data obtained by the program code across various sources utilizing one or more of a natural language classifier, retrieve and rank application programming interfaces, and trade off analytics application programming interfaces. An audio-type application programming interface can also provide audio related application programming interface services, in the event that the collected data includes audio, which can be utilized by the program code, including but not limited to natural language processing, text to speech capabilities, and/or translation.

In one or more embodiments, the program code utilizes a neural network to analyze event-related data to generate the model utilized to predict the state of a given event at a given time. Neural networks are a biologically-inspired programming paradigm which enable a computer to learn and solve artificial intelligence problems. This learning is referred to as deep learning, which is a subset of machine learning, which is an aspect of artificial intelligence. It includes a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in multiple source processing, which the program code in one or more embodiments accomplishes when obtaining data and generating a model for predicting states of a given event.

Although various aspects and/or embodiments are described herein, other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different techniques may be used to generate simulation data, perform filtering and/or compare datasets. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:

verifying validity of a trained artificial intelligence model used in artificial intelligence processing in one or more environments, the verifying validity including:

generating a training dataset from the trained artificial intelligence model using reverse data generation of the trained artificial intelligence model, wherein the training dataset is generated using a simulation of a distribution of data represented by the trained artificial intelligence model, wherein random simulation inputs are passed through the trained artificial intelligence model which attaches confidences to the simulation inputs and wherein the training dataset is generated based thereon;

comparing the training dataset generated using the reverse data generation with a test dataset used to evaluate the trained artificial intelligence model, the comparing to determine a relationship between the training dataset that was generated and the test dataset;

removing data from the test dataset determined to have a predefined relationship with the training dataset to obtain a new test dataset;

using the new test dataset to verify the validity of the trained artificial intelligence model; and automatically updating, using program code including a learning agent, the trained artificial intelligence model based on feedback and selected data from one or more sources to increase accuracy of the trained artificial intelligence model in performing the artificial intelligence processing.

2. The computer-implemented method of claim 1, wherein the generating the training dataset includes constructing a simulation dataset of the trained artificial intelligence model, the simulation dataset being the simulation of the distribution of data represented by the trained artificial intelligence model, and using the simulation dataset to generate the training dataset.

3. The computer-implemented method of claim 2, wherein the constructing the simulation dataset includes randomly generating vector data to conform to a selected distribution model.

4. The computer-implemented method of claim 2, wherein the generating the training dataset further includes:

passing the simulation dataset through the trained artificial intelligence model to obtain confidence values for simulation data of the simulation dataset;

comparing the confidence values to a confidence comparator value; and forming a retained dataset that includes the simulation data that have confidence values with a predetermined relationship with the confidence comparator value, the retained dataset to be used to generate the training dataset.

5. The computer-implemented method of claim 4, wherein the generating the training dataset further includes filtering the retained dataset to obtain the training dataset, the filtering including removing redundancy from the retained dataset to obtain the training dataset.

6. The computer-implemented method of claim 5, wherein the filtering includes performing density clustering to partition the retained dataset and remove the redundancy.

7. The computer-implemented method of claim 1, wherein the comparing is based on data distributions of the training dataset and the test dataset, and wherein test dataset data that overlaps training dataset data are removed from the test dataset.

8. The computer-implemented method of claim 1, wherein the comparing the training dataset and the test dataset includes performing anomaly detection on a mix of the training dataset and the test dataset to obtain the new test dataset.

9. The computer-implemented method of claim 8, wherein the performing the anomaly detection includes using an estimation network of a selected anomaly detection technique to detect a degree of integration in the training dataset and the test dataset.

10. The computer-implemented method of claim 1, wherein the generating the training dataset is performed absent availability of a dataset used to train the trained artificial intelligence model.

11. A computer system for facilitating processing within a computing environment, the computer system comprising:

a memory; and a computing device in communication with the memory, wherein the computer system is configured to perform a method, said method comprising:

verifying validity of a trained artificial intelligence model used in artificial intelligence processing in one or more environments, the verifying validity including:

generating a training dataset from the trained artificial intelligence model using reverse data generation of the trained artificial intelligence model, wherein the training dataset is generated using a simulation of a distribution of data represented by the trained artificial intelligence model, wherein random simulation inputs are passed through the trained artificial intelligence model which attaches confidences to the simulation inputs and wherein the training dataset is generated based thereon;

comparing the training dataset generated using the reverse data generation with a test dataset used to evaluate the trained artificial intelligence model, the comparing to determine a relationship between the training dataset that was generated and the test dataset;

removing data from the test dataset determined to have a predefined relationship with the training dataset to obtain a new test dataset;

using the new test dataset to verify the validity of the trained artificial intelligence model; and automatically updating, using program code including a learning agent, the trained artificial intelligence model based on feedback and selected data from one or more sources to increase accuracy of the trained artificial intelligence model in performing the artificial intelligence processing.

12. The computer system of claim 11, wherein the generating the training dataset includes constructing a simulation dataset of the trained artificial intelligence model, the simulation dataset being the simulation of the distribution of data represented by the trained artificial intelligence model, and using the simulation dataset to generate the training dataset.

13. The computer system of claim 12, wherein the generating the training dataset further includes:

passing the simulation dataset through the trained artificial intelligence model to obtain confidence values for simulation data of the simulation dataset;

comparing the confidence values to a confidence comparator value; and forming a retained dataset that includes the simulation data that have confidence values with a predetermined relationship with the confidence comparator value, the retained dataset to be used to generate the training dataset.

14. The computer system of claim 13, wherein the generating the training dataset further includes filtering the retained dataset to obtain the training dataset, the filtering including removing redundancy from the retained dataset to obtain the training dataset.

15. The computer system of claim 11, wherein the comparing is based on data distributions of the training dataset and the test dataset, and wherein test dataset data that overlaps training dataset data are removed from the test dataset.

16. A computer program product for facilitating processing within a computing environment, the computer program product comprising:

one or more computer readable storage media and program instructions collectively stored on the one or more computer readable storage media to perform a method comprising:

verifying validity of a trained artificial intelligence model used in artificial intelligence processing in one or more environments, the verifying validity including:

generating a training dataset from the trained artificial intelligence model using reverse data generation of the trained artificial intelligence model, wherein the training dataset is generated using a simulation of a distribution of data represented by the trained artificial intelligence model, wherein random simulation inputs are passed through the trained artificial intelligence model which attaches confidences to the simulation inputs and wherein the training dataset is generated based thereon;

comparing the training dataset generated using the reverse data generation with a test dataset used to evaluate the trained artificial intelligence model, the comparing to determine a relationship between the training dataset that was generated and the test dataset;

removing data from the test dataset determined to have a predefined relationship with the training dataset to obtain a new test dataset;

using the new test dataset to verify the validity of the trained artificial intelligence model; and automatically updating, using program code including a learning agent, the trained artificial intelligence model based on feedback and selected data from one or more sources to increase accuracy of the trained artificial intelligence model in performing the artificial intelligence processing.

17. The computer program product of claim 16, wherein the generating the training dataset includes constructing a simulation dataset of the trained artificial intelligence model, the simulation dataset being the simulation of the distribution of data represented by the trained artificial intelligence model, and using the simulation dataset to generate the training dataset.

18. The computer program product of claim 17, wherein the generating the training dataset further includes:

passing the simulation dataset through the trained artificial intelligence model to obtain confidence values for simulation data of the simulation dataset;

comparing the confidence values to a confidence comparator value; and forming a retained dataset that includes the simulation data that have confidence values with a predetermined relationship with the confidence comparator value, the retained dataset to be used to generate the training dataset.

19. The computer program product of claim 18, wherein the generating the training dataset further includes filtering the retained dataset to obtain the training dataset, the filtering including removing redundancy from the retained dataset to obtain the training dataset.

20. The computer program product of claim 16, wherein the comparing is based on data distributions of the training dataset and the test dataset, and wherein test dataset data that overlaps training dataset data are removed from the test dataset.

* * * * *